United States Patent
Yoshida et al.

(10) Patent No.: US 6,425,451 B2
(45) Date of Patent: Jul. 30, 2002

(54) MOTORCYCLE

(75) Inventors: Koji Yoshida, Hamamatsu; Shinichi Yamada, Hamakita, both of (JP)

(73) Assignee: Suzuki Kabushiki Kaisha, Hamamatsu (JP)

(*) Notice: Subject to any disclaimer, the term of this patent is extended or adjusted under 35 U.S.C. 154(b) by 0 days.

(21) Appl. No.: 09/790,605

(22) Filed: Feb. 23, 2001

(30) Foreign Application Priority Data

Feb. 25, 2000 (JP) ........................................ 2000-050207

(51) Int. Cl.$^7$ .............................................. F01M 13/04
(52) U.S. Cl. ........................................ 180/219; 123/572
(58) Field of Search ........................... 180/219; 123/572

(56) References Cited

U.S. PATENT DOCUMENTS

| | | | |
|---|---|---|---|
| 4,280,582 A | * | 7/1981 | Kouyama et al. ............ 180/219 |
| 4,608,949 A | * | 9/1986 | Nakano et al. ............ 123/73 A |
| 4,825,818 A | * | 5/1989 | Hamamura et al. ........ 123/41.86 |
| 6,237,577 B1 | * | 5/2001 | Takahashi et al. ........... 123/572 |
| 6,306,190 B1 | * | 10/2001 | Tsuruta et al. ............ 123/198 E |
| 2001/0015191 A1 | * | 8/2001 | Kawamoto ................ 123/196 R |

* cited by examiner

*Primary Examiner*—Kevin Hurley
(74) *Attorney, Agent, or Firm*—Oblon, Spivak, McClelland, Maier & Neustadt, P.C.

(57) ABSTRACT

An engine of a motorcycle includes a cylinder block and a cylinder head inclined forward on an upper front portion of a crankcase of the engine in an engine installed state. The crankcase comprises a plurality of vertical case sections comprising an upper case section, a middle case section and a lower case section, and the crankshaft is pivotally supported at a mating portion between the upper case section and the middle case section and a transmission shaft is pivotally supported at a mating portion between the middle case section and the lower case section. The upper case section is integrally formed with a lower portion of the cylinder block, and a breather cover manufactured independently is provided in a forward inclined manner so as to cover an upper surface of the middle case section at the rear portion of the uppercase section so as to define a breather chamber inside the breather cover and a breather hose extends substantially perpendicularly upward from a rear upper portion of the breather cover and is connected to the air cleaner at a bottom portion thereof.

8 Claims, 3 Drawing Sheets

MOTORCYCLE

BACKGROUND OF THE INVENTION

The present invention relates to a motorcycle mounted with an engine in which a breather chamber is disposed on an upper surface portion of a crankcase of an engine.

Many of straddle type motorcycles have such a structure that a fuel tank is installed on a front half upper portion of a motorcycle frame, a seat is provided at the rear portion thereof, and the engine is mounted below the fuel tank.

In a case where the engine is an in-line multi-cylinder type, as disclosed in Japanese Patent Laid-open Publication No. HEI 8-86223, the motorcycle often has a layout in which a cylinder block and a cylinder head are mounted on a front portion of an upper surface of a crankcase of the engine, and a crankshaft and a transmission shaft extending in the frame width direction are pivotally supported inside of the crankcase.

The engine disclosed in this publication has a structure that a cylinder block and a cylinder head are provided in a forward inclined manner on the front portion of the upper surface of the crankcase which is vertically splitable into three sections, comprising an upper case section, a middle case section and a lower case section, a crankshaft is pivotally supported on a mating surface portion (joint portion) between the upper case section and the middle case section, and two transmission shafts are pivotally supported on a mating surface (joint portion) between the middle case section and the lower case section. In this manner, the crankshaft and the transmission shafts are pivotally supported in a stepped arrangement from each other, and a distance between axes of the crankshaft and the front transmission shaft is reduced, thus making small a size of the crankcase (i.e. engine) in the front and rear direction (longitudinal direction of the motorcycle body).

With such an in-line multi-cylinder structure engine, a breather chamber is integrally provided on the rear portion of the upper surface of the upper case section of the crankcase. The breather chamber acts as an oil separation chamber having a labyrinth structure with a predetermined capacity and is adapted to alleviate a pressure change in the crankcase occurring with a reciprocal motion of a piston of a piston-cylinder assembly of the engine and leakage of a blowby gas without jetting externally the oil stored in the crankcase outside. As the capacity of the breather chamber increases, vapor-liquid separability of the blowby gas and the oil becomes better, thus making the operation of the engine smooth.

However, main components of the engine, such as crankcase, cylinder block and cylinder head, are generally formed of aluminum castings, and the outer wall of the breather chamber integrally provided on the upper case section of the crankcase is also formed of an aluminum casting. Therefore, as the capacity of the breather chamber increases, the weight of the engine also increases, and as a result, it becomes hence difficult to make increase the capacity of the breather chamber.

Moreover, even if there is adopted a structure in which the capacity of the breather chamber is increased, no enough space will exist in the vicinity of the crankcase, because supplementary equipments or members such as starter motor and water pump are installed in the vicinity of the crankcase. Thus, it is considered as only one option to increase the height dimension of the breather chamber. However, if the height of the breather chamber is made high over the mating surface portion between the upper case section of the crankcase and the cylinder block of the engine, it becomes difficult to work or assemble the uppercase section of the crankcase, which will involve an increase of the production cost of the engine.

SUMMARY OF THE INVENTION

An object of the present invention is to substantially eliminate inconveniences or difficulties encountered in the prior art mentioned above and to provide a motorcycle capable of reducing a production cost of the engine and improving a layout of supplementary machinery around the engine, while improving the breather performance and light weight of the engine.

This and other objects can be achieved according to the present invention by providing, in one aspect, a motorcycle in which an engine is mounted below a fuel tank and an air cleaner, the engine includes a cylinder block and a cylinder head inclined forward on an upper front portion of a crankcase of the engine in an engine installed state, the crankcase comprising a plurality of vertical case sections including an upper case section, a middleclass section and a lower case section, the crankshaft is pivotally supported at a mating portion between the uppercase section and the middle case section and a transmission shaft is pivotally supported on a mating portion between the middle case section and the lower case section, wherein the upper case section is integrally formed with a lower portion of the cylinder block, and a breather cover manufactured independently is provided in a forward inclined manner so as to cover an upper surface of the middle case section at the rear portion of the uppercase so as to define an interior of the breather cover as a breather chamber and a breather hose extends substantially perpendicularly upwards from a rear upper portion of the breather cover and is connected to the air cleaner at a bottom portion thereof.

In preferred examples of the above aspect, the breather cover is provided substantially at an intermediate position in a width direction of a motorcycle frame extending in the longitudinal direction of the motorcycle body, a starter motor for the engine is mounted on one side of the breather cover and a water hose for a liquid-cooled-engine extending from a water pump is arranged on the other side thereof.

A breather hose extending from the rear upper portion of the breather cover extends between a fuel pump disposed to protrude downward from a rear lower surface of the fuel tank and a fuel feed pipe of a fuel supply system located in front of the fuel pump and is connected to the air cleaner.

A portion in a mating portion between the middle case section and the breather cover is recessed downward so as to form a breather recess with a bottom surface inclined forward, a breather hole is formed in the vicinity of an intermediate portion in the front and rear direction of a side wall of the breather recess so as to form an oil return path in the vicinity of the front end on the bottom surface, so that the breather hole and the oil return path are respectively communicated with an interior of the crankcase, a gasket is interposed between the breather recess and the breather cover, the interior of the breather cover is divided by partition walls so as to form a plurality of compartments which lie in a row along the front and rear direction of the engine and communicate with each other, an opening is formed to the gasket so that the front most compartment is communicated with the front end portion of the breather recess, and an extension of the breather hose is communicated with the rearmost compartment.

The mating portion between the middle case section and the breather cover is formed in parallel with the mating portion between the middle case section and the upper case section so as to provide same height level.

In a modified aspect, there is provided a motorcycle comprising:

a motorcycle body provided with a body frame extending in a longitudinal direction thereof;

a steering member supporting a front wheel to be rotatable and connected to the body frame;

a swing arm unit mounted to the body frame and connected to a rear wheel to be rotatable;

an engine disposed substantially central portion of the motorcycle body and including a crankcase, a cylinder block and a cylinder head in a forward inclined manner in a standing state of the motorcycle, the crankcase being separated into a plurality of vertical case sections comprising an upper case section, a middle case section and a lower case section so that a crankshaft is pivotally supported to a mating portion between the upper and middle case sections;

a transmission shaft pivotally supported to a mating portion between the middle and lower case sections;

a fuel tank disposed above the engine;

a seat member disposed to a rear portion of the fuel tank;

a fuel supply unit disposed at a rear upper portion of the engine; and an air cleaner disposed above the fuel supply unit, wherein the upper case section is secured to a lower portion of the cylinder block, and a breather cover is provided in a forward inclined manner so as to cover an upper surface of the middle case section at the rear portion of the upper case so as to define a breather chamber in the breather cover and a breather hose extends upward from a rear upper portion of the breather cover and is connected to the air cleaner at a bottom portion thereof.

According to the structures and subject features of the present invention mentioned above, since the breather cover is provided independently from the uppercase section, the breather cover can be formed of a material lighter than that of the upper case section formed of an aluminum casting. Moreover, since the height dimension of the breather cover can be increased, regardless of the shape of the upper case, the capacity of the breather can be increased.

The improvement in the breather performance and light weight of the engine can be both contemplated. The breather chamber having a large capacity can be provided without impairing the layout of the supplementary machinery around the engine.

Moreover, according to the preferred examples of the present invention, since the breather hose is arranged substantially in the perpendicular direction, vapor-liquid separability of the blowby gas and the oil becomes excellent to thereby improve the breather performance.

Furthermore, the interior of a large-capacity breather chamber composed of the breather cover and the breather recess is divided by the gasket and the partition walls and formed like a labyrinth. Moreover, the extension of the breather hose and the oil return path are located on the uppermost portion and the lowermost portion of the breather chamber, respectively. Accordingly, the vapor-liquid separability of the blowby gas and the oil can be improved in the crankcase, thereby improving the breather performance.

Furthermore, the mating portion with the uppercase section and the mating portion with the breather cover in the middle case section of the crankcase can be made flat at the same time, and hence, the middle case section can be easily manufactured, thus reducing the production cost of the engine.

The nature and further characteristic features of the present invention will be made more clear from the following descriptions made with reference to the accompanying drawings.

DESCRIPTION OF THE PREFERRED EMBODIMENT

One embodiment of the present invention will be described hereunder with reference to the accompanying drawings.

Figure 1:
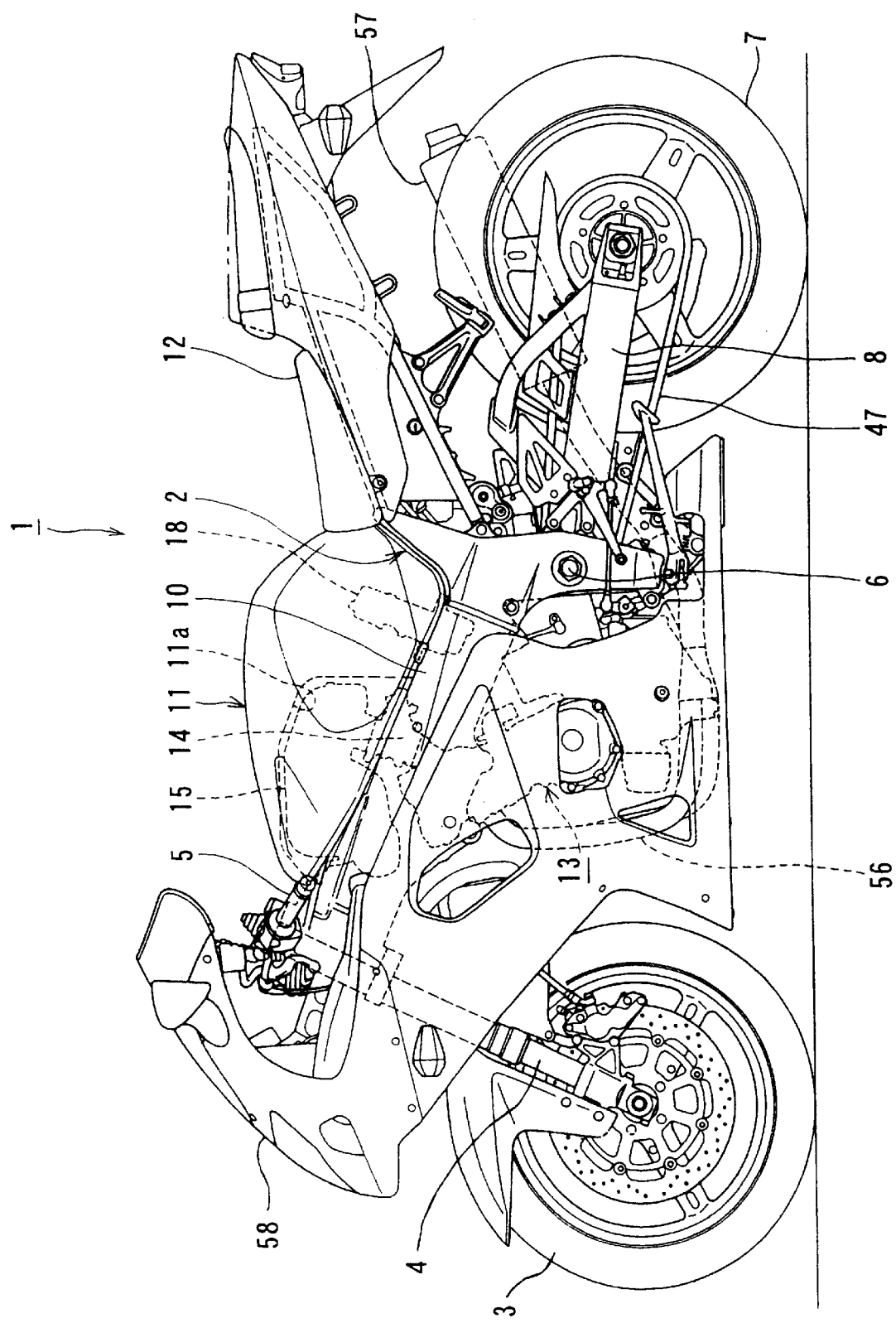
FIG. 1 is a left side view showing one embodiment of a motorcycle according to the present invention.

With reference to FIG. 1 showing a motorcycle 1 of the present invention, the motorcycle 1 is provided with a motorcycle frame 2 supporting, at a front end thereof, a steering member including a front fork 4 for supporting a front wheel 3 to be pivotal or turn in lateral direction with respect to the longitudinal direction of the motorcycle 1 together with a handle cover 5 and also provided with a swing arm 8 for supporting a rear wheel 7 to be pivotal on a pivot shaft 6 supported in the width (lateral) direction of the frame of the motorcycle body at its central lower portion to be vertically movable.

Figure 2:
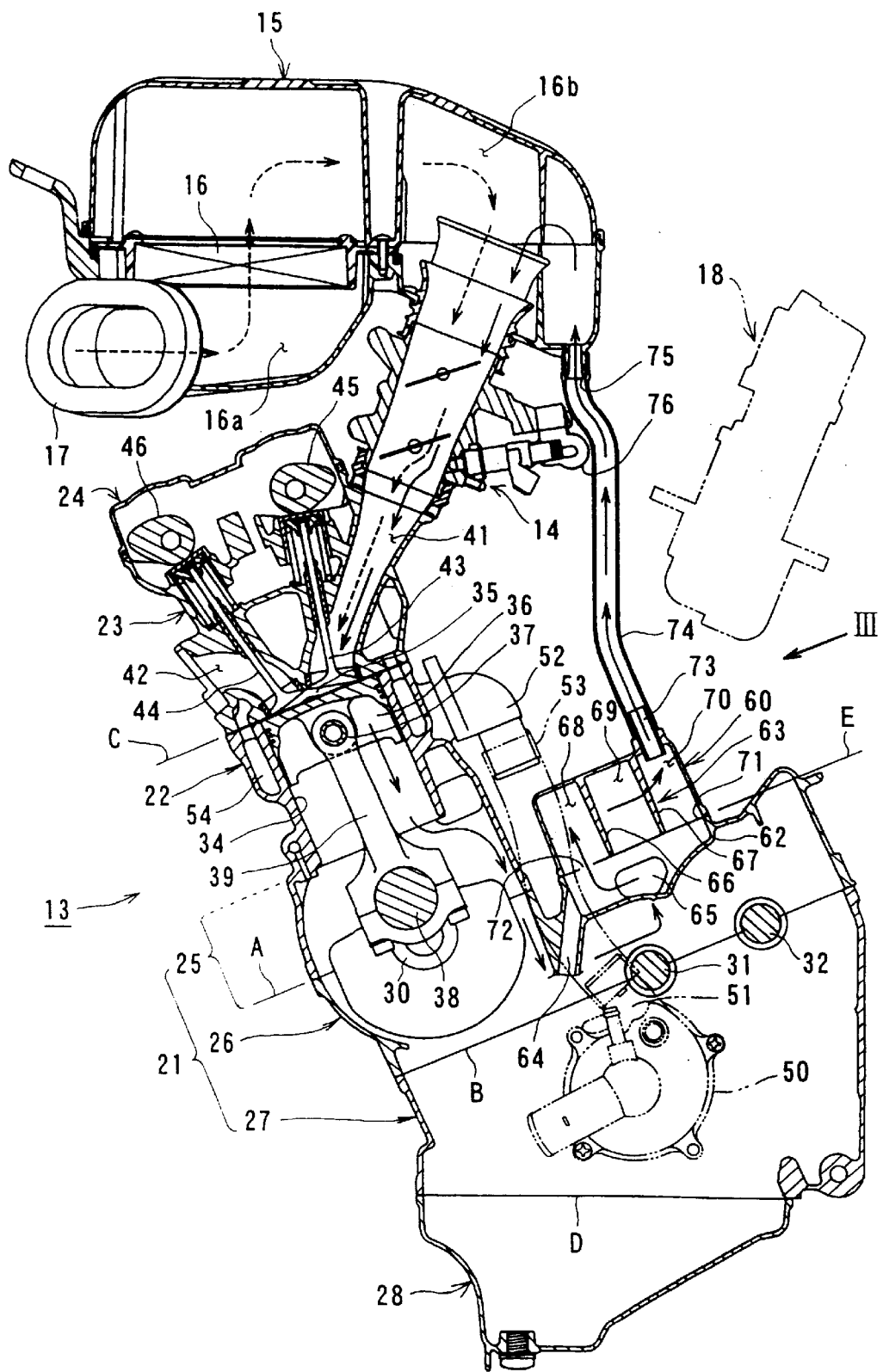
FIG. 2 is an enlarged sectional view of an engine, a fuel injection system, an air cleaner, a fuel pump and the like of the motorcycle of FIG. 1 of the present invention.
Figure 3:
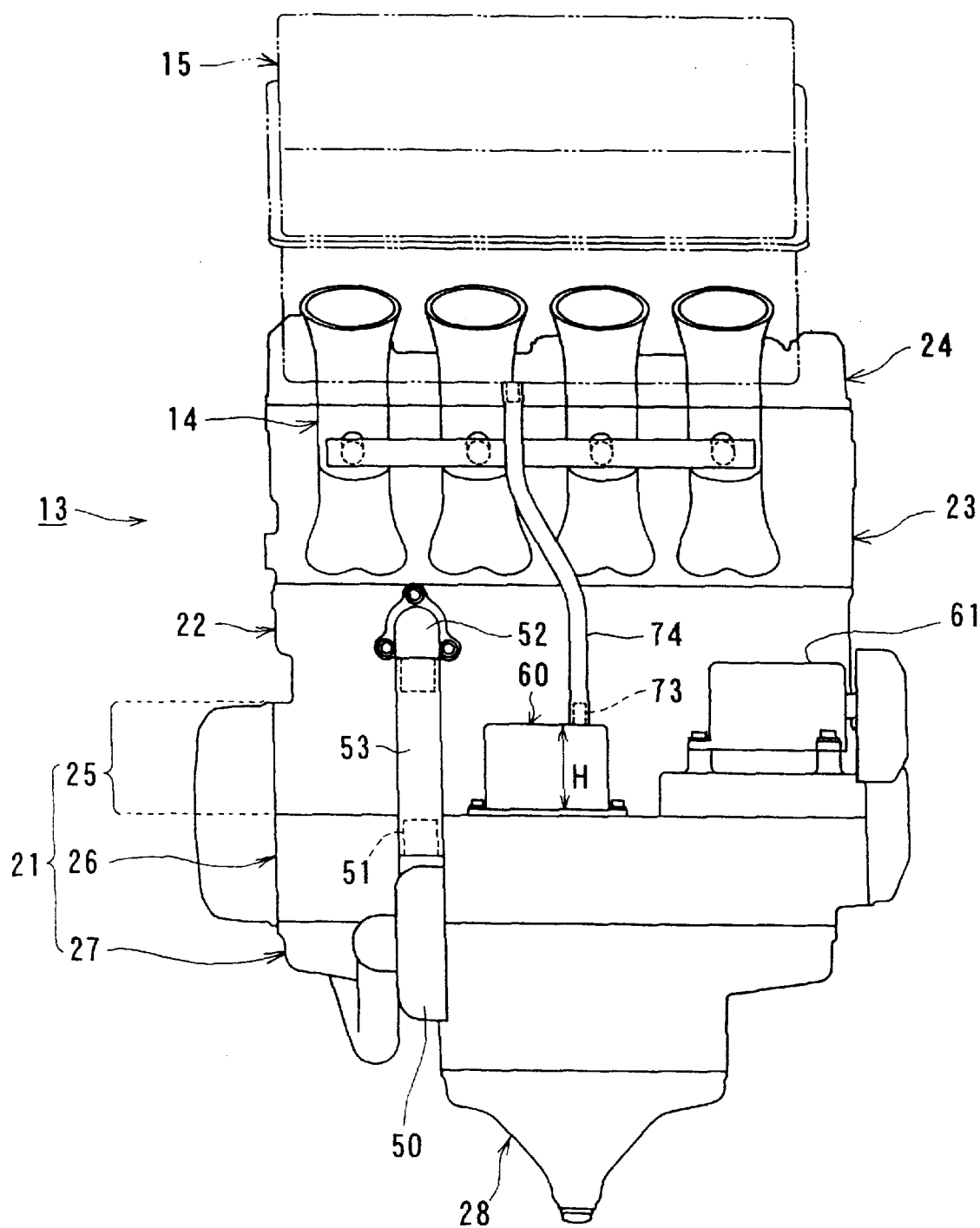
FIG. 3 is an illustration viewed from a rear side of the engine in a direction of an arrow III in FIG. 2.

The front half upper portion of the motorcycle frame 2 is comprised of a pair of left and right thick main pipes 10, and a fuel tank 11 is installed on the main pipes with a seat 12 being disposed at the rear portion of the fuel tank 11. For example, an in-line four-cylinder four-stroke-cycle DOHC (double-over-head-cam) type water cooled engine 13 is mounted below the fuel tank 11. As shown in FIG. 2 and FIG. 3, a fuel supply unit as an fuel injection system 14 including transverse four fuel injectors is connected to the rear upper portion of the engine 13, and an air cleaner 15 having a box shape is installed on the fuel injection system 14.

The air cleaner 15 is housed in a recessed portion (recess) 11a formed to the lower surface of the fuel tank 11, and the interior of the air cleaner 15 is divided by an air filter 16 into a dirty side 16a and a clean side 16b with the dirty side 16a being provided with an air inlet 17 leading to the outside thereof and the clean side 16b being connected with the upper portion of the fuel injection system 14. A fuel pump 18 is located in the fuel tank 11 at the rear portion of the air cleaner 15 and the fuel injection system 14 so that the lower portion of the fuel pump 18 protrudes downward from the rear lower surface of the fuel tank 11.

FIG. 2 is an enlarged sectional view showing the arrangement of the engine 13, the fuel injection system 14, the air cleaner 15, the fuel pump 18 and the like showing one embodiment of the present invention, and FIG. 3 is aback-side view of the engine 13 as viewed in the direction of the arrow III in FIG. 2.

The engine 13 has a cylinder block 22, a cylinder head 23, and a head cover 24 formed through aluminum casting so as to be inclined forward and installed on the upper surface front portion of a crankcase 21 also formed through the aluminum casting. The crankcase 21 is vertically divided into three sections, in an engine installed state to a motorcycle, comprising an upper case section 25, a middle case section 26 and a lower case section 27, and an oil pan 28 is mounted to the lower portion of the lower case section 27.

Further, these upper, middle and lower case sections 25, 26 and 27 will be referred to hereunder as merely upper, middle and lower case 25, 26 and 27 for the convenience sake.

The upper case 25 of the crankcase 21 is integrally formed with the lower portion of the cylinder block 22, and a crankshaft 30 disposed in the engine crankcase is pivotally supported on a mating portion (joint surface) A between the upper case 25 and the middle case 26 in a shape along the width direction of the motorcycle frame, and two front and rear transmission shafts 31 and 32 are pivotally supported at the rear portion of the crankshaft 30 at a mating portion (joint surface) B between the middle case 26 and the lower case 27.

The mating portion A between the upper case 25 (cylinder block 22) and the middle case 26 is in parallel with the mating portion B between the middle case 26 and the lower case 27 and with a mating portion (joint surface) C between the cylinder block 22 and the cylinder head 23, thus, all these mating portions A, B and C being inclined forward as shown in the side view. However, since a mating portion (joint surface) D between the lower case 27 and the oil pan 28 is made horizontal, the side portion of the lower case 27 has substantially a wedge shape which becomes narrower toward the front side.

On the other hand, four cylinder bores 34 are formed transversely parallelly in the cylinder block 22, and four combustion chambers 35 are formed on the bottom face of the cylinder head 23 so as to align with the cylinder bores 34, respectively, and a piston 36 (piston pin 37) inserted into the cylinder bore 34 to be slidable and a crank pin 38 disposed eccentrically with the axis of the crankshaft 30 are connected by means of a connection rod 39.

Moreover, an inlet port 41 and an exhaust port 42 communicated with the combustion chamber 35 from the outside thereof are formed in the cylinder head 23, and an inlet valve 43 disposed in the inlet port 41 and an exhaust valve 44 disposed in the exhaust port 42 are controlled to be opened and closed at a predetermined timing by an inlet cam shaft 45 and an exhaust cam shaft 46 pivotally supported in the cylinder head 23, respectively.

The reciprocal motion of the piston 36 in the cylinder bore 34 is converted into the rotational motion of the crankshaft 30 through a connection rod 39, and the rotation speed of the crankshaft 30 is changed by a transmission, not shown, mounted rotatably on two transmission shafts 31 and 32, is taken out as an output of the engine 13 and is then transmitted to the rear wheel 7 through a chain 47 (see FIG. 1).

A water pump 50 for circulating a cooling water is installed on the left side of the crankcase 21 (lower case 27), and an outlet union 51 and an inlet union 52 disposed on the rear surface of the cylinder block 22 are connected through a water hose 53 to supply the cooling water discharged from the water pump 50 to a water jacket 54 in the cylinder block 22 and the cylinder head 23 so as to perform a cooling function. Moreover, the oil, not shown, collected in the oil pan 28 is supplied to each section of the engine 13 through an operation of the oil pump, thus performing the lubrication.

To the inlet port 41 is connected the lower portion of the above-described fuel injection system 14, and to the outlet port 42 is connected an exhaust pipe 56 (see FIG. 1). The exhaust pipe 56 extends from the exhaust port 42, passes around the front surface and the lower surface of the engine 13, extends rearward and is then connected to an exhaust muffler 57. The front half upper portion of the frame body of the motorcycle 1 is covered by a streamlined cowling 58 to thereby cover the engine 13, the fuel injection system 14, the air cleaner 15, the exhaust pipe 56, etc. from the outside.

Here, a breather cover 60 formed independently is provided so as to be inclined forward on the upper surface portion of the middle case 26 and at the rear position of the upper case 25. This breather cover 60 is provided substantially in an intermediate position in the width direction of the motorcycle, as shown in FIG. 3, and a starter motor 61 for engine starting is installed on one side (for example, the right side) of the breather cover 60, and the water hose 53 is arranged in a prescribed location on the other side thereof (for example, the left side).

The mating portion (joint surface) E between the breather cover 60 and the middle case 26 is formed in parallel with the mating portion A between the middle case 26 and the upper case 25 (cylinder block 22) in the same height level. A breather recess (recessed portion) 62 is formed on the portion of the mating portion E so as to be recessed downward, and the breather recess 62 and the inner space of the breather cover 60 are joined together to thereby partition and define a breather chamber 63.

The bottom surface of the breather recess 62 has a forward inclination, and an oil return path 64 is formed in the vicinity of the front end thereof, while a breather hole 65 is formed in the vicinity of the intermediate portion in the front and rear direction (longitudinal direction of the motorcycle) of the side wall of the breather recess 62. The oil return path 64 and the breather hole 65 are respectively communicated with the interior of the crankcase 21. On the other hand, the inner space of the breather cover 60 is divided by two front and rear partition walls 66 and 67 so as to form three compartments 68, 69 and 70 which lie in a row along the front and rear direction and communicate with each other like a labyrinth.

A plate-like gasket 71 is interposed between the breather recess 62 and the breather cover 60 (mating surface E), so that the frontmost compartment 68 in the breather cover 60 is communicated with the front end portion of the breather recess 62 through an opening 72 formed to the front portion of the gasket 71. Moreover, the rearmost compartment 70 is communicated with the outside portion through a union 73 disposed at the rear upper portion of the breather cover 60.

The one end of a breather hose 74 is connected to the union 73 and the other end thereof is connected to a union 75 disposed on the bottom portion, on the clean side 16b, of the air cleaner 15 from the lower side thereof. This breather hose 74 passes between the fuel pump 18 disposed in the fuel tank 11 and a fuel feeding pipe 76 of the fuel injection system 14 located in front of the fuel pump 18 so as to be arranged substantially perpendicularly.

In the motorcycle 1 of the structure as mentioned above, at the time of operation of the engine 13, the pressure in the crankcase 21 continually changes due to the reciprocal motion of the piston 36 in the cylinder bore 34 and the blowby gas leaking from the combustion chamber 35 to the crankcase 21. This pressure change is alleviated by the breather chamber 63.

That is to say, at the time of the pressure increase in the crankcase 21, as shown by a solid arrow in FIG. 2, the blowby gas passes from the crankcase 21 through the breather hole 65 into the breather recess 62 and further through the opening 72 of the gasket 71 into the frontmost compartment 68 in the breather cover 60, and thereafter, the pulsation of the blowby gas is alleviated, while moving sequentially towards the rear compartments 69 and 70. Then, the blowby gas flows through the breather hose 74 through the union 73 of the breather cover 60, finally to the clean side 16b of the air cleaner 15, and is then drawn into the engine 13 together with the fresh air (shown by a broken line arrow) taken into the air cleaner 15.

Accordingly, unburnt components (HC, CO etc.) harmful to the environment, which is included in the blowby gas, is not discharged outside and burnt again in the combustion chamber 35, thus avoiding the air pollution. When the interior of the crankcase 21 becomes negative pressure, the fresh air taken into the air cleaner 15 flows backward along the route mentioned above and then flows into the crankcase 21.

At the time of the flow-back of the blowby gas in the crankcase 21 to the air cleaner 15, as described above, the oil component contained in a large amount in the blowby gas in form of mist flows down from the oil return path 64 and returns to the oil pan 28, while being mostly vapor-liquid separated in the breather chamber 63 (breather recess 62 and compartments 68, 69 and 70). The vapor-liquid separation effect will be increased, as the capacity of the breather chamber 63 increases.

Since the bottom surface of the breather recess 62 is inclined forward to form the oil return path 64 in the vicinity of the front end thereof the oil component flowing down to the bottom surface of the breather recess 62 returns to the oil pan 28 quickly without staying in the breather chamber 63. Accordingly, the oil component hardly flows into the breather hose 74, and even if the oil component flows into the breather hose 74, since the breather hose 74 is arranged substantially perpendicularly, the oil component is separated during the upward movement in the breather hose 74 and then flows downward along the inner wall of the breather hose 74. As a result, there is no possibility that the oil component flows into the air cleaner 15.

In the engine 13 of the structure mentioned above, the breather cover 60 is arranged independently from the upper case 25 of the crankcase, so that the breather cover 60 is formed of a light material such as resin, magnesium or the like, which is particularly lighter than the aluminum material forming the upper case 25, and the height dimension H (see FIG. 3) of the breather cover 60 can be increased, regardless of the shape of the upper case 25, thus ensuring sufficiently large capacity of the breather chamber 63. If the breather cover 60 becomes light, even if the breather cover 60 is made large, the engine 13 can be made light, and hence improvement in the breather performance and light weight of the engine 13 can be both contemplated.

Moreover, since the breather cover 60 is provided substantially in the intermediate position in the width direction on the middle case 26, the starter motor 61 is installed on the one side thereof, and the water hose 53 is arranged on the other side thereof the breather chamber 63 having a large capacity can be provided without impairing the layout of the supplementary machinery around the engine 13.

In addition, since the breather chamber 63 has a structure in which the breather cover 60 is disposed on the breather recess disposed through the gasket 71 on the side of the middle case 26, and the interior of the breather cover 60 is divided by the partition walls 66 and 67 so as to form a plurality of compartments 68, 69 and 70, the interior of the breather chamber 63 is formed as a complicated labyrinth. Moreover, since the extension of the breather hose 74 (union 73) and the oil return path 64 are located in the uppermost portion and the lowermost portion of the breather chamber 63, respectively, the vapor-liquid separability of the oil component from the blowby gas in the crankcase 21 becomes excellent, thus achieving an improved breather performance in these viewpoints.

Furthermore, since the breather hose 74 extending from the rear upper portion of the breather cover 60 passes between the fuel pump 18 and a fuel feed pipe 76 of the fuel injection system 14 located in front of the fuel pump 18 so as to be connected to the air cleaner 15, the breather hose 74 is arranged substantially perpendicularly, thus improving the vapor-liquid separability of the oil component from the blowby gas in the breather hose 74 and achieving the improved breather performance.

On the other hand, since the mating portion E between the middle case 26 and the breather cover 60 is formed to be parallel to the mating portion A between the middle case 26 and the upper case 25 so as to provide the same height level, both the mating portions A and E can be made flat at the same time of producing the middle case 26. Accordingly, the middle case 26 can be easily produced, contributing to reduction in the production cost of the engine 13.

It is to be noted that the present invention is not limited to the described embodiment and many other changes and modifications may be made without departing from the scopes of the appended claims.

What is claimed is:

1. A motorcycle comprising:
   a motorcycle body provided with a body frame extending in a longitudinal direction thereof;
   a steering member supporting a front wheel to be rotatable and connected to the body frame;
   a swing arm unit mounted to the body frame and connected to a rear wheel to be rotatable;
   an engine disposed substantially central portion of the Motorcycle body and including a crankcase, a cylinder block and a cylinder head in a forward inclined manner in a standing state of the motorcycle, said crankcase being separated into a plurality of vertical case section comprising an upper case section, a middle case section and a lower case section so that a crankshaft is pivotally supported to a mating portion between the upper and middle case sections;
   a transmission shaft pivotally supported to a mating portion between the middle and lower case sections;
   a fuel tank disposed above the engine;
   a seat member disposed to a rear portion of the fuel tank
   a fuel supply unit disposed at a rear upper portion of the engine; and
   an air cleaner disposed above the fuel supply unit,
   wherein said upper case section is secured to a lower portion of the cylinder block, and a breather cover is provided in a forward inclined manner so as to cover an upper surface of the middle case section at the rear portion of the upper case so as to Define an interior of the breather cover as a breather chamber and a breather hose extends upward from a rear upper portion of the breather cover and is connected to the air cleaner at a bottom portion thereof.

2. A motorcycle according to claim 1, wherein said breather cover is provided at an intermediate position in a width direction of a motorcycle frame, a starter motor for the engine is mounted on one side of the breather case and a water hose for a liquid-cooled-engine is arranges on the other side thereof.

3. A motorcycle according to claim 1, wherein said breather hose extends between a fuel pump disposed so as to protrude downward from a rear lower surface of the fuel tank and a fuel feed pipe of the fuel supply unit located in front of the fuel pump and is connected to the air cleaner.

4. A motorcycle according to claim 1, wherein a mating portion between the middle case section and the breather cover is provided with a recess portion recessed downward so as to form a breather recess with a bottom surface inclined forward.

5. A motorcycle according to claim 4, wherein a breather hole is formed in a vicinity of an intermediate portion in the front and rear direction of a side wall of the breather recess so as to form an oil return path in a vicinity of the front end on the bottom surface, so that the breather hole and the oil return path are respectively communicated with an interior of the crankcase.

6. A motorcycle according to claim 4, wherein a gasket is interposed between the breather recess and the breather cover, the interior of the breather cover is divided by partition walls into a plurality of compartments which lie in a row in the front and rear direction of the engine and communicate with each other, the gasket is formed with an opening so that the frontmost compartment is communicated with the front end portion of the breather recess, and an extension of the breather hose is communicated with the rearmost compartment.

7. A motorcycle according to claim 1, wherein the mating portion between the middle case section and the breather cover is formed in parallel with the mating portion between the middle case section and the upper case section so as to provide same height level.

8. A motorcycle in which an engine is mounted below a fuel tank and an air cleaner, the engine includes a cylinder block and a cylinder head inclined forward on an upper front portion of a crankcase of the engine in an engine installed state, the crankcase is separated into a plurality of vertical case sections comprising an upper case section, a middle case section and a lower case section, the crankshaft is pivotally supported on a mating portion between the upper case section and the middle case section and a transmission shaft is pivotally supported on a mating portion between the middle case section and the lower case section, wherein said upper case section is integrally formed with a lower portion of the cylinder block, and a breather cover manufactured independently is provided in a forward inclined manner so as to cover an upper surface of the middle case section at the rear portion of the upper case so as to define a breather chamber inside the breather cover and a breather hose extends substantially perpendicularly upwards from a rear upper portion of the breather cover and is connected to the air cleaner at a bottom portion thereof.

* * * * *